(12) United States Patent
Hara et al.

(10) Patent No.: US 7,490,704 B2
(45) Date of Patent: Feb. 17, 2009

(54) BICYCLE DISC BRAKE PAD

(75) Inventors: Masaaki Hara, Sakai (JP); Toru Iwai, Sakai (JP); Takashi Fujitani, Sakai (JP); Tsukasa Fukuta, Sakai (JP)

(73) Assignee: Shimano Inc., Osaka (JP)

( * ) Notice: Subject to any disclaimer, the term of this patent is extended or adjusted under 35 U.S.C. 154(b) by 60 days.

(21) Appl. No.: 11/452,254

(22) Filed: Jun. 14, 2006

(65) Prior Publication Data

US 2007/0068750 A1    Mar. 29, 2007

(30) Foreign Application Priority Data

Sep. 29, 2005    (JP) .............................. 2005-285055

(51) Int. Cl.
*F16D 65/04* (2006.01)

(52) U.S. Cl. .................. 188/250 G; 188/251 A (58) Field of Classification Search ............. 188/251 R, 188/251 A, 251 M
See application file for complete search history.

(56) References Cited

U.S. PATENT DOCUMENTS

| | | | |
|---|---|---|---|
| 2,161,597 A | | 6/1939 | Swartz |
| 3,710,914 A | * | 1/1973 | Lowey et al. ........... 192/107 R |
| 4,456,578 A | | 6/1984 | Ward |
| 4,552,259 A | * | 11/1985 | Albertson .............. 192/107 M |
| 5,161,654 A | * | 11/1992 | Valentin ................. 188/251 R |
| 6,364,072 B1 | * | 4/2002 | Grupp et al. ................. 188/165 |
| 6,648,108 B2 | * | 11/2003 | Grupp et al. ................. 188/165 |
| 6,908,667 B2 | * | 6/2005 | Christ et al. ............. 428/292.1 |
| 2004/0099493 A1 | * | 5/2004 | Himmelsbach et al. . 188/250 B |
| 2006/0131117 A1 | * | 6/2006 | Pabst ....................... 188/264 R |
| 2006/0260881 A1 | * | 11/2006 | Henley et al. .......... 188/1.11 W |

FOREIGN PATENT DOCUMENTS

| | | | |
|---|---|---|---|
| EP | 0 183 036 A2 | | 6/1986 |
| GB | 865282 | * | 4/1961 |
| GB | 2 154 614 A | | 9/1985 |
| JP | 04282037 | * | 10/1992 |
| JP | 08-188769 A | | 7/1996 |
| JP | 11-193842 A | | 7/1999 |

OTHER PUBLICATIONS

Kobe Steel Engineering Reports, vol. 47, No. 2, Materials Technology for Automobiles.

* cited by examiner

*Primary Examiner*—Pam Rodriguez
(74) *Attorney, Agent, or Firm*—Global IP Counselors, LLP (57) ABSTRACT

A bicycle disc brake pad is used in a disc brake device and is configured to reduce restrictions on backplate material in a disc brake pad for a bicycle in which a friction member is bonded to a backplate by a diffusion bonding method. The bicycle disc brake pad has a backplate, a spray coating layer and a friction member. The surface of the backplate has a spray coat surface. The spray coating layer is a copper or copper alloy layer formed on the spray coat surface. The friction member is bonded to the spray coating layer by a diffusion bonding method. Preferably, the spray coat surface of the backplate is formed with a rough surface on at least part of the spray coat surface.

15 Claims, 7 Drawing Sheets

BICYCLE DISC BRAKE PAD

CROSS-REFERENCE TO RELATED APPLICATIONS

This application claims priority under 35 U.S.C. § 119 to Japanese Patent Application No. 2005-285055, filed Sep. 29, 2005. The entire disclosure of Japanese Patent Application No. 2005-285055 is hereby incorporated herein by reference.

BACKGROUND OF THE INVENTION

1. Field of the Invention

This invention generally relates to a bicycle brake pad. More specifically, the present invention relates to a bicycle disc brake pad in which a friction member is bonded to a backplate.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle brake device. In particular, in recent years, bicycles have been provided with disc braking devices in order to improve braking performance.

Bicycle disc brake devices are provided for controlling and stopping the relative rotation of the bicycle wheels. Each disc brake device typically includes a metal disc brake rotor that rotates in unison with one of the wheels, and disc brake calipers with brake pads that selectively contact the disc brake rotor and apply pressure thereto to apply a braking force. Typical disc brake devices can be fluid actuated (i.e. by fluid pressure) or cable (mechanically) actuated The disc brake pads normally apply a braking force to a wheel by clamping the disc brake rotor that rotates together with the wheel. Disc brake pads often have a sintered metallic dry-type friction member formed of copper-based metal, and a backplate to which the friction member is bonded. The backplate is often formed of steel such as stainless alloy and the like. These types of disc brake pads are conventionally and widely known (see, for example, Japanese Laid-Open Patent Publication No. H08-188769). In conventional disc brake pads having a sintered metallic friction member, the friction member is manufactured by simultaneously calcining the sintered metal and bonding the sintered metal to the backplate by a diffusion bonding method. Specifically, the sintered metal of the friction member is calcined onto a copper plating formed on the bonding surface of the backplate. When a brake pad is manufactured in this way, the copper plating layer and the backplate are bonded by chemical bonding that produces a metallic bond.

In conventional structures in which a friction member is bonded on a copper plated surface by a diffusion bonding method, a copper plating layer for chemically bonding to the backplate is formed on the backplate, and a friction member is sintered on the copper plating layer. Therefore, there is a problem concerning restrictions of the quality of the backplate inasmuch as material having the quality of a strong chemical bonding with copper must be used for the backplate. For example, when titanium alloy and the like containing titanium and titanium alloy is used for the backplate, the copper plating layer may peel from the backplate since copper and titanium have a weak chemical bonding power, thus producing concern that the backplate may separate from the friction member.

In view of the above, it will be apparent to those skilled in the art from this disclosure that there exists a need for an improved bicycle brake pad. This invention addresses this need in the art as well as other needs, which will become apparent to those skilled in the art from this disclosure.

SUMMARY OF THE INVENTION

One object of the present invention is to provide a bicycle brake pad that alleviates the restriction placed on the backplate material used for manufacturing bicycle disc brake pads in which the friction member is bonded to the backplate by a diffusion bonding method.

The foregoing object can basically be attained in accordance with a first aspect of the present invention by providing a bicycle disc brake pad that basically includes a backplate, a spray coating layer and a friction member. The backplate includes a spray coat surface. The spray coating layer contains copper (pure copper or a copper alloy) that is deposited on the spray coat surface of the backplate. The friction member is bonded on the spray coating layer to create a diffusion bond by a diffusion bonding method. In this disc brake pad, a spray coating layer is formed on the backplate by a spray coating method rather than forming a plating layer. A friction member is formed on the spray coating layer by, for example, sintering, and the friction member is bonded to the spray coating layer by a diffusion bonding method. When the spray coating layer is formed by a spray coat method, the backplate is roughened so that a spray coating layer with a rough surface is formed on the surface of the backplate. Furthermore, a rough surface can also be formed by shot blasting and the like so as to produce a surface roughness on the spray coating layer before spray coating. The miniscule concavo-convexities of the spray coat surface are permeated and solidified by the spray coat particles of copper or copper alloy. The so-called anchor effect makes it difficult for the bonded interface of the physically bonded backplate and spray coating layer to separate. Since the spray coating layer is physically bonded to the backplate by the anchor effect, materials of diverse qualities may be used for the backplate insofar as the material possesses the quality of being capable of forming a rough surface for the spray coat surface by performing shot blasting beforehand so as to increase the surface roughness by spray coating. Therefore, there are fewer limitations placed on the qualities of the backplate compared to when a plating layer is chemically bonded with the backplate by diffusion bonding.

The bicycle disc brake pad according to a second aspect of the present invention provides the pad of the first aspect of the present invention with the backplate being formed of titanium or titanium alloy. In this case, since the backplate is formed of titanium or titanium alloy, the backplate has reduced weight with expected higher strength compared to other light-weight metals such as aluminum and the like.

The bicycle disc brake pad according to a third aspect of the present invention provides the pad of the first and second aspects of the present inventions with the spray coat surface of the backplate being formed with a rough surface on at least part of the spray coat surface. In this case, the anchor effect relative to spray coating layer is enhanced by the rough surface formed beforehand, thereby increasing the adhesion of the spray coating layer.

The bicycle disc brake pad according to a fourth aspect of the present invention provides the pad in anyone of the first through third aspects of the present inventions with the friction member being formed by calcining and bonding at least one group of powders selected from among groups including dichromium trioxide, tin and compounds thereof, and copper and compounds thereof. In this case, since the friction member is configured by material that readily bonds with the copper or copper alloy spray coating layer, the friction member can be securely affixed to the backplate through the spray coating layer.

The bicycle disc brake pad according to a fifth aspect of the present invention provides the pad in anyone of the first through third aspects of the present inventions with the spray coating layer is formed on an area of the backplate that is larger than a contact area of the friction member. In this case, the friction member can be bonded at an optional position of the backplate shape.

According to the present invention, since the spray coating layer is physically bonded to the backplate by the anchor effect, materials of diverse qualities can be used for the backplate insofar as the material possesses the quality of being capable of forming a rough surface for the spray coat surface by performing shot blasting beforehand so as to increase the surface roughness by spray coating. Therefore, there are fewer limitations placed on the qualities of the backplate compared to when the backplate is chemically bonded to a plating layer by diffusion bonding.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
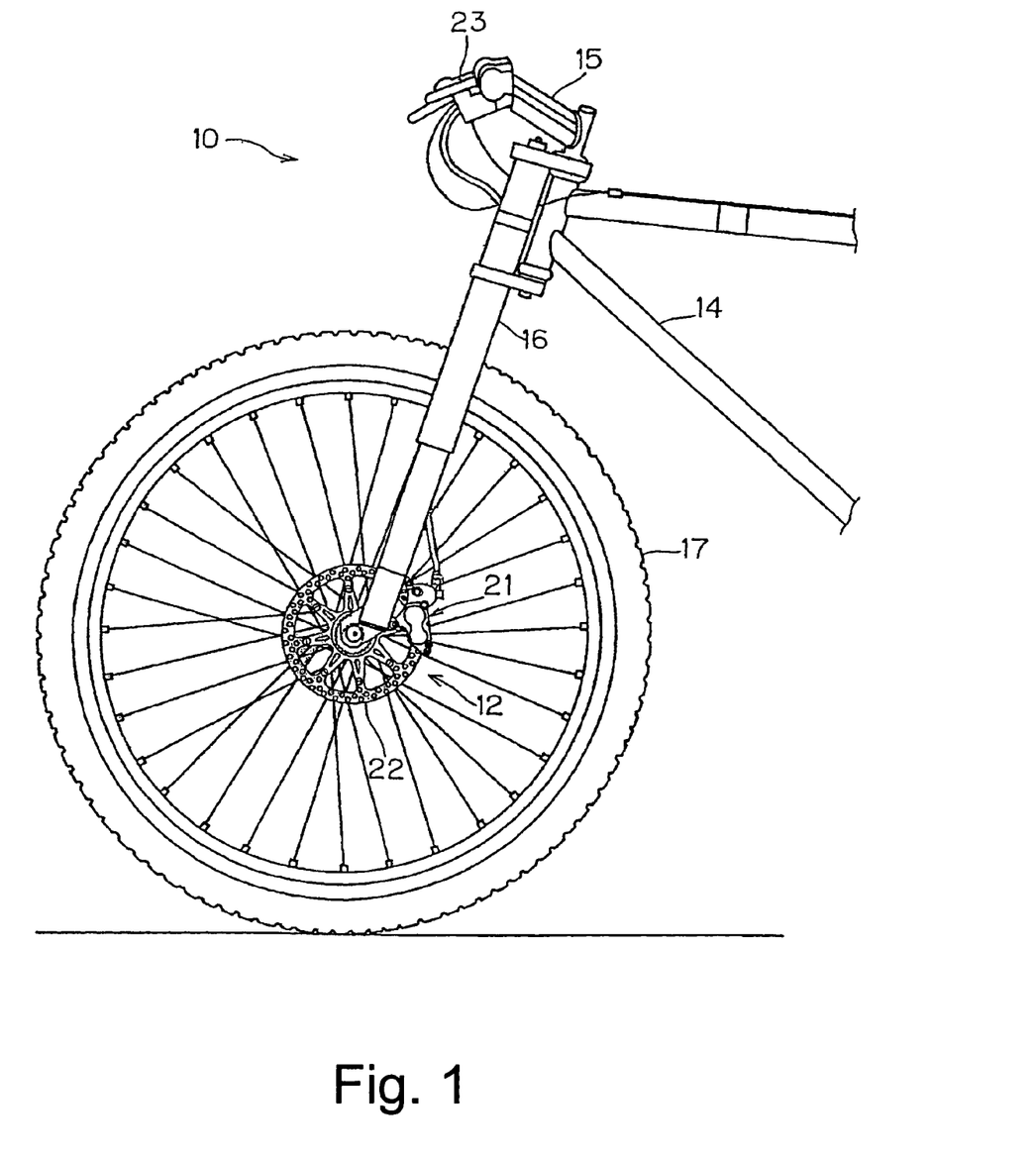
FIG. 1 is a side elevational view of the front portion of a bicycle with a bicycle disc brake device coupled thereto in accordance with a preferred embodiment of the present invention.

Referring initially to FIG. 1, a bicycle 10 is illustrated that is equipped with a bicycle disc brake device 12 in accordance with a preferred embodiment of the present invention. The various parts and/or components (technology) of bicycles such as the bicycle 10 are generally well known in the bicycle art. Accordingly, the bicycle 10 and the various structural and operating components of the bicycle 10 will not be described and/or illustrated in detail herein, except as related to the bicycle disc brake device 12 of the present invention.

The bicycle 10 is conventionally known, except for certain parts of the disc brake device 12, as explained below. Accordingly, the bicycle 10 includes a bicycle frame 14 with a handlebar 15, front and rear forks 16 (only front fork shown), front and rear wheels 17 (only front wheel shown), and a conventional drive train (not shown). The drive train (not shown) basically includes front and rear sprockets, a chain, front and rear derailleurs, etc. or the like. The front fork 16 illustrated herein has a double crown suspension, Of course, it will be apparent to those skilled in the art from this disclosure that he bicycle 10 may also include various conventional parts or components as needed and/or desired without departing from the present invention.

The bicycle disc brake device 12 basically includes a bicycle disc brake caliper 21 mounted on the front fork 16, a bicycle disc brake rotor 22 and a brake operating mechanism 23.

Figure 2:
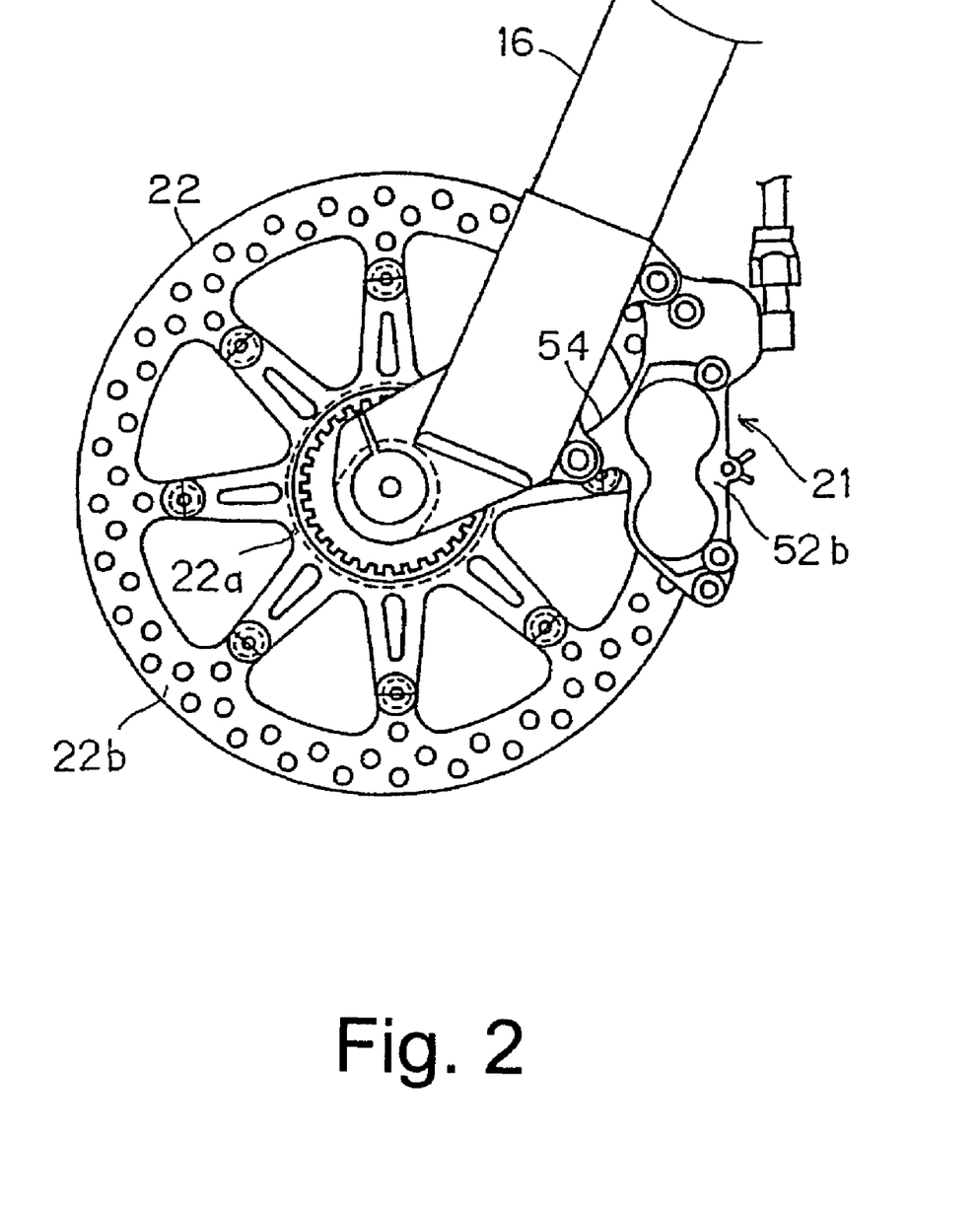
FIG. 2 is an enlarged, partial side elevational view of the portion of the bicycle illustrated in FIG. 1, with the disc brake rotor for a disc brake device coupled thereto.
Figure 3:
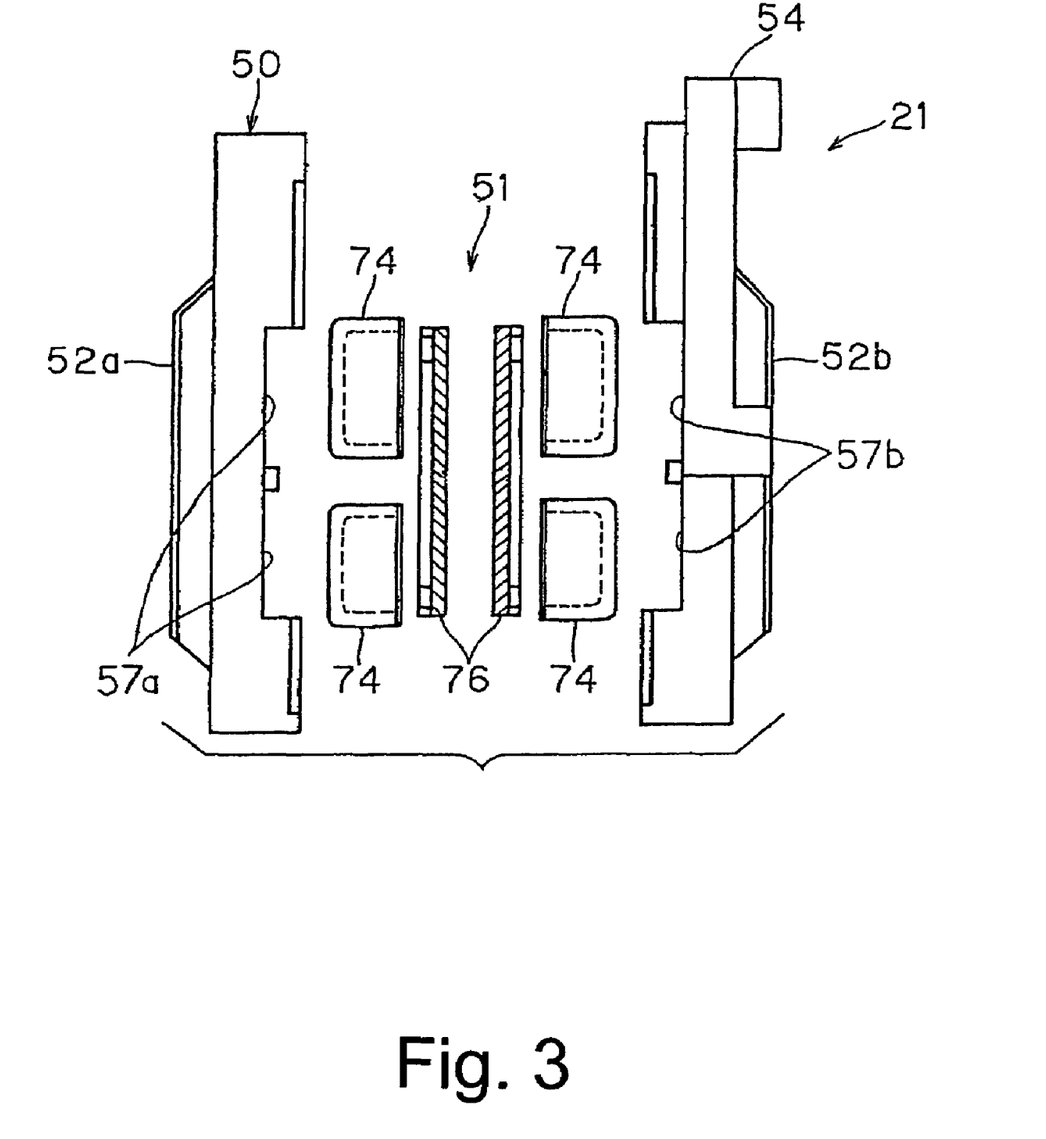
FIG. 3 is an exploded schematic (diagrammatic) view of the disc brake caliper of the disc brake device illustrated in FIGS. 1 and 2.

The disc brake caliper 21 is attached to the front fork 16 of the bicycle 10 at a location near the disc brake rotor 22, and applies a clamping force on the disc brake rotor 22 to stop it from rotating. As illustrated in FIGS. 2 and 3, the brake caliper 21 basically includes a housing 50 and a piston unit 51. The housing 50 is constructed of a thermally conducting material such as an aluminum alloy or the like. The housing 50 includes a first housing member 52a and a second housing member 52b fixedly attached (e.g. bolt-joined) to the first housing member 52a. The two housing members 52a and 52b have substantially the same shape, but are substantially mirror images of each other. Hydraulic tubing 86 is connected between the second housing member 52b and the brake operating mechanism 23 to supply hydraulic brake fluid (e.g. mineral oil) to both housing members 52a and 52b.

Figure 5:
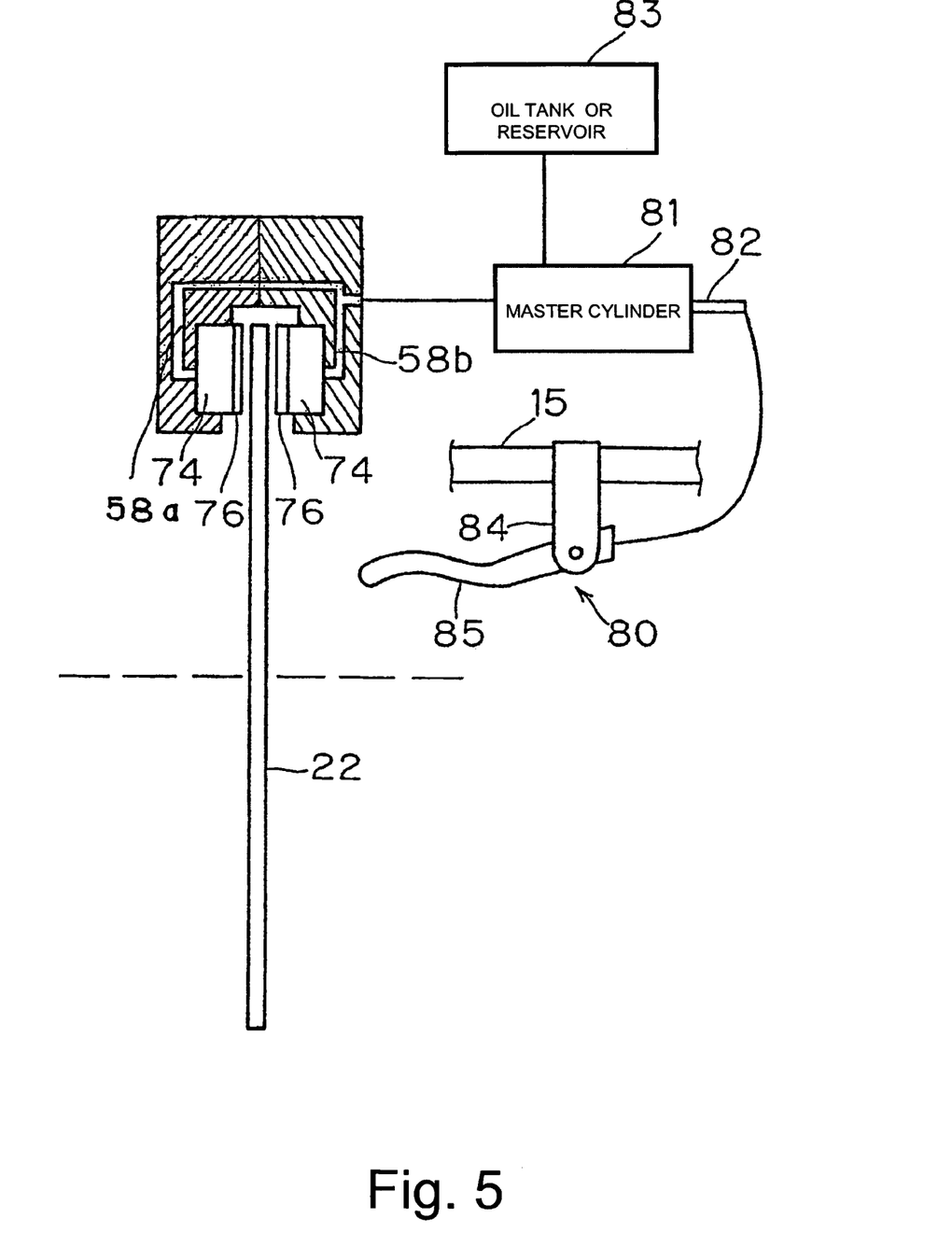
FIG. 5 is a schematic (diagrammatic) structural diagram of the disc brake operating mechanism illustrated in FIG. 4.

The second housing member 52b has an outwardly extending flange forming an attachment member 54 for fixedly attaching (bolting) the brake caliper 21 to the front fork 16. When both housing members 52a and 52b are bolted tightly together (i.e. assembled), a brake slot is formed between them to allow the disc brake rotor 22 to be partially received therein to rotate through the slot. As illustrated in FIGS. 3 and 5, two round cylindrical recesses 57a are formed in the first housing member 52a with two pistons 74 received therein. Also two round cylindrical recesses 57b are formed in the second housing member 52b with the two pistons 74 received therein. In other words, the recesses 57a and 57b movably support (house) the pistons 74 within the disc brake caliper 21. Additionally, fluid conduits (oil lines) 58a and 58b are formed in the first and second housing members 52a and 52b, respectively, in order to supply hydraulic brake fluid (oil) to the cylindrical recesses 57a and 57b, respectively. The hydraulic brake fluid (oil) supplied from the brake operating mechanism 23 via the tubing 86 flows into the second housing member 52b and through the oil lines 58a and 58b into the recesses 57a and 57b, allowing the piston unit 51 to be operated.

As illustrated in FIG. 3, the piston unit 51 basically includes the four pistons 74 and a pair of brake pads 76. The pistons 74 slidably fit (seated) into the pairs of cylindrical recesses 57a and 57b to freely move (reciprocate) between release positions and braking positions (not shown). The brake pads 76 are disposed at the free ends (tips) of the pistons 74 (i.e. outside of the recesses 57a and 57b) and move in unison. Thus, when the pistons 74 are moved from the release positions to the braking positions, the brake pads 76 also move from the release positions to the braking positions. When in the braking position, the brake pads 76 engages and clamps the disc brake rotor 22 to apply a friction force in order to apply a slowing/stopping force (brake force) to the front wheel 17 by the disc brake rotor 22. When in the release position, the brake pads 76 move away from (withdraw) the disc brake rotor 22 for allowing the disc brake rotor 22 to freely rotate. The piston unit 51 basically moves relative to the housing 50 in a conventional manner. In other words, the disc brake caliper 21 is basically conventional, except as discussed and/or illustrated herein.

Figure 6:
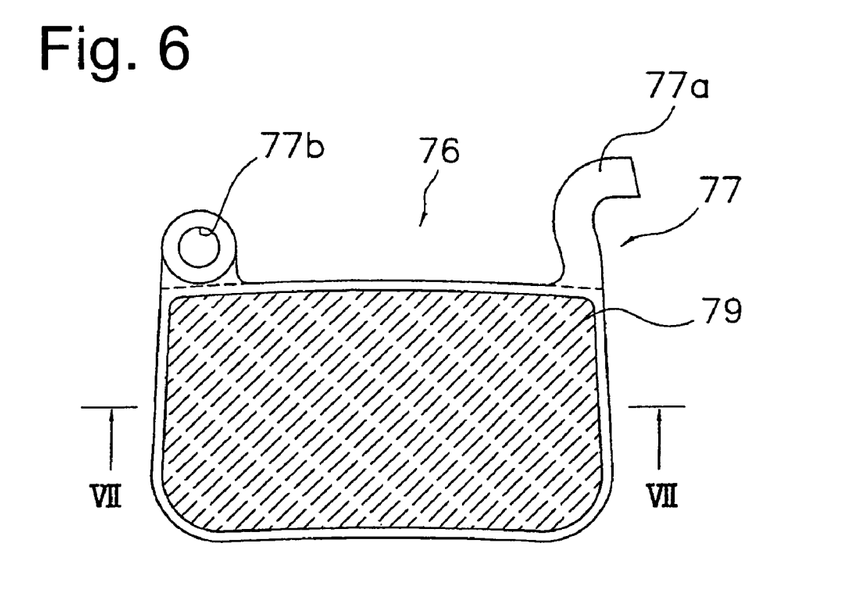
FIG. 6 is a side elevational view of one of the disc brake pads of the illustrated embodiment of the present invention for the disc brake device illustrated in FIGS. 1 and 2.
Figure 7:
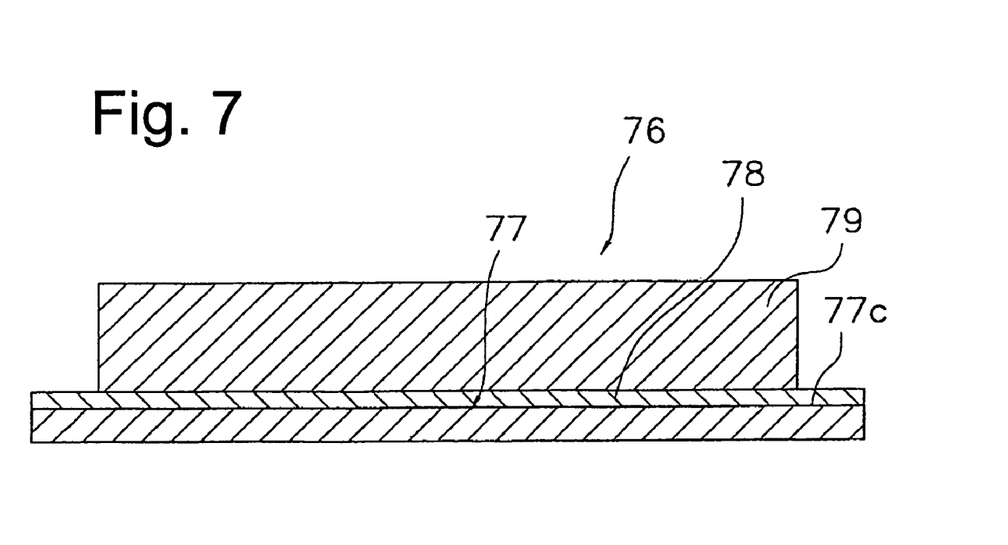
FIG. 7 is a simplified cross sectional view of one of the disc brake pads of the illustrated embodiment of the present invention as seen along on section line VII-VII line of FIG. 6.

In the illustrated embodiment, for example, the brake pad 76 is a sintered pad that is provided with a backplate 77, a spray coating layer 78 formed on the backplate 77, and a friction member 79 bonded on the spray coating layer 78 by a diffusion bonding method, as shown in FIGS. 6 and 7. The "spray diffusion coating" is not chemical connecting (engagement bonding), it is hard engagement between the backplate 77 (preferably pure titanium or titanium alloy) and the spray coating layer 78.

Figure 8:
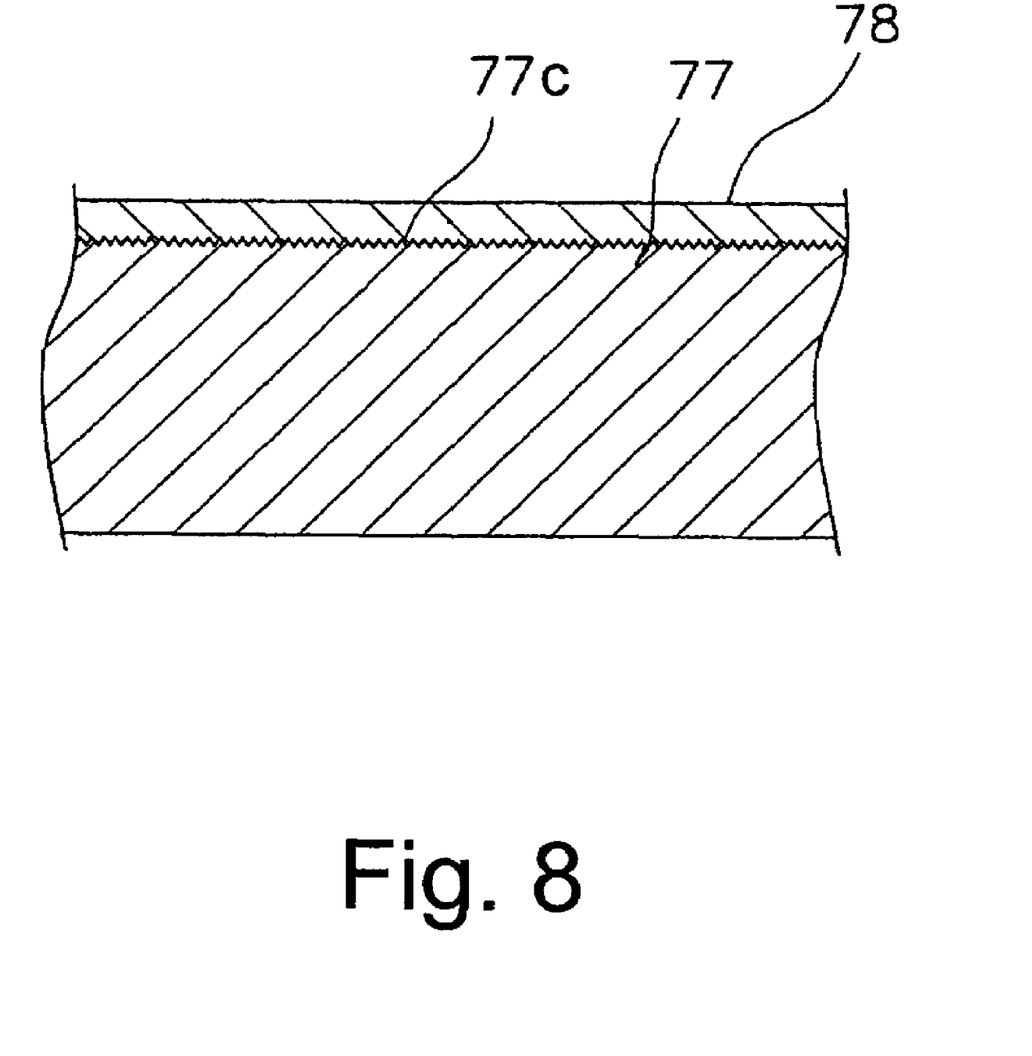
FIG. 8 is an enlarged, simplified cross sectional view of one of the disc brake pads of the illustrated embodiment of the present invention.

The backplate 77 is preferably a thin plate-like member that is formed of pure titanium, titanium alloy or other suitable low thermally conductive metal material. Moreover, the backplate 77 is preferably approximately 1.7 mm to 1.8 mm in thickness. The backplate 77 basically has a hooked-shaped locking part 77a and a round support part 77b. The hooked-shaped locking part 77a is configured and arranged for locking the backplate 77 to the first and second housing members 52a and 52b. The round support part 77b is configured and arranged to provide support for advancing and retracting the backplate 77 relative to the first and second housing members 52a and 52b. As shown in FIG. 8, prior to formation of the spray coating layer 78 on the backplate 77, a rough spray coat surface 77c is formed on the backplate 77 by shot blast processing or the like. When the spray coat surface 77c is formed by a shot blast process, it is desirable to use blast particles approximately 50 μm to 200 μm in size. In particular, the surface roughness of the backplate 77 becomes excessive when the blast particles size is less than 50 μm, and the anchor effect becomes difficult to obtain. Conversely, although the anchor effect is not particularly affected when blast particles larger than 200 μm are used, there is concern that the backplate 77 will be deformed since the backplate 77 is made of titanium or titanium alloy with a thickness of approximately 1.7 mm to 1.8 mm.

Although FIG. 8 shows the spray coat surface 77c as a schematically uniform ridged surface, the spray coat surface 77c is actually formed as an irregular surface by the shot blast process. The spray coat surface 77c is formed on part of the backplate 77 indicated by the dashed line in FIG. 6, excluding the locking part 77a and the support part 77b of the backplate 77. The spray coat surface 77c can also be formed on the spray coat part alone by masking the surface except the spray coat part. Further, when the spray coat surface 77c is roughened for spray coating, the spray coat surface 77c can also be formed at the same time that the spray coating layer 78 is formed, rather than forming the spray coat surface 77c beforehand.

The spray coating layer 78 can be formed, for example, by gas-type and electric-type spray coat methods in which copper or copper alloy base material is heated to melting using a combustion gas, plasma or the like as a heat source, and sprayed on the backplate 77 by gas or compressed air. The thickness of the spray coating layer 78 should be at least 50 μm, and a thickness within the 80 μm to 110 μm range is desirable. The thickness is somewhat thicker than a conventional plating layer (approximately 10 μm) formed by plating.

The friction member 79 is laminated onto the spray coating layer 78, and is a sintered metallic component formed by, for example, shaping, calcinating and bonding a metallic powder such as dichromium trioxide, tin and compounds thereof, copper and compounds thereof and the like. The thickness of the friction member 79 is approximately 2.0 mm to 2.5 mm.

The method of manufacturing the disc brake pad 76 will now be described. In manufacturing the backplate 77, a titanium or titanium alloy plate material is prepared as a core material. Then, the titanium or titanium alloy plate material is punched to form the overall peripheral shape using, for example, a hydraulic press. Next, one of the surfaces of the backplate 77 is shot blast to form the spray coat surface 77c. This process is unnecessary when forming the spray coat surface 77c by a spray coat process. Thus, the backplate 77 preparation work is completed.

Then, the spray coating layer 78 is formed on the spray coat surface 77c by the spray coat process described above. The source material of the friction member 79 including a mixed compound of sintering metallic powder is injected into a metal die, pressed at a temperature of 900° C. and sintered to a desired shape. Thus, the friction member 79 is diffusion bonded onto the spray coat surface 77c.

Since the sintered metallic friction member 79 is bonded to the backplate 77 simultaneously with sintering, the friction member 79 bonding process is simplified. Furthermore, since the spray coating layer 78 is physically bonded to the backplate 77 by the anchor effect, materials of diverse qualities can be used for the backplate 77 insofar as the material possesses the quality of being capable of forming a rough surface on the spray coat surface 77c by performing shot blasting beforehand or the like beforehand so as to increase the surface roughness by spray coating. Therefore, there are fewer limitations placed on the qualities of the backplate 77 compared to when a plating layer is chemically bonded with the backplate by diffusion bonding.

As shown in FIG. 1, the disc rotor 22 is attached to the hub of the front wheel 17, and rotates in conjunction with the front wheel 17. As shown in FIG. 2, the disc rotor 22 is, for example, a stainless steel circular disc member, in which a hub mounting part 22a position centrally, and a ring-shaped rotor part 22b configuring the friction surface on the to the outer periphery side are integrally formed as a unit.

Figure 4:
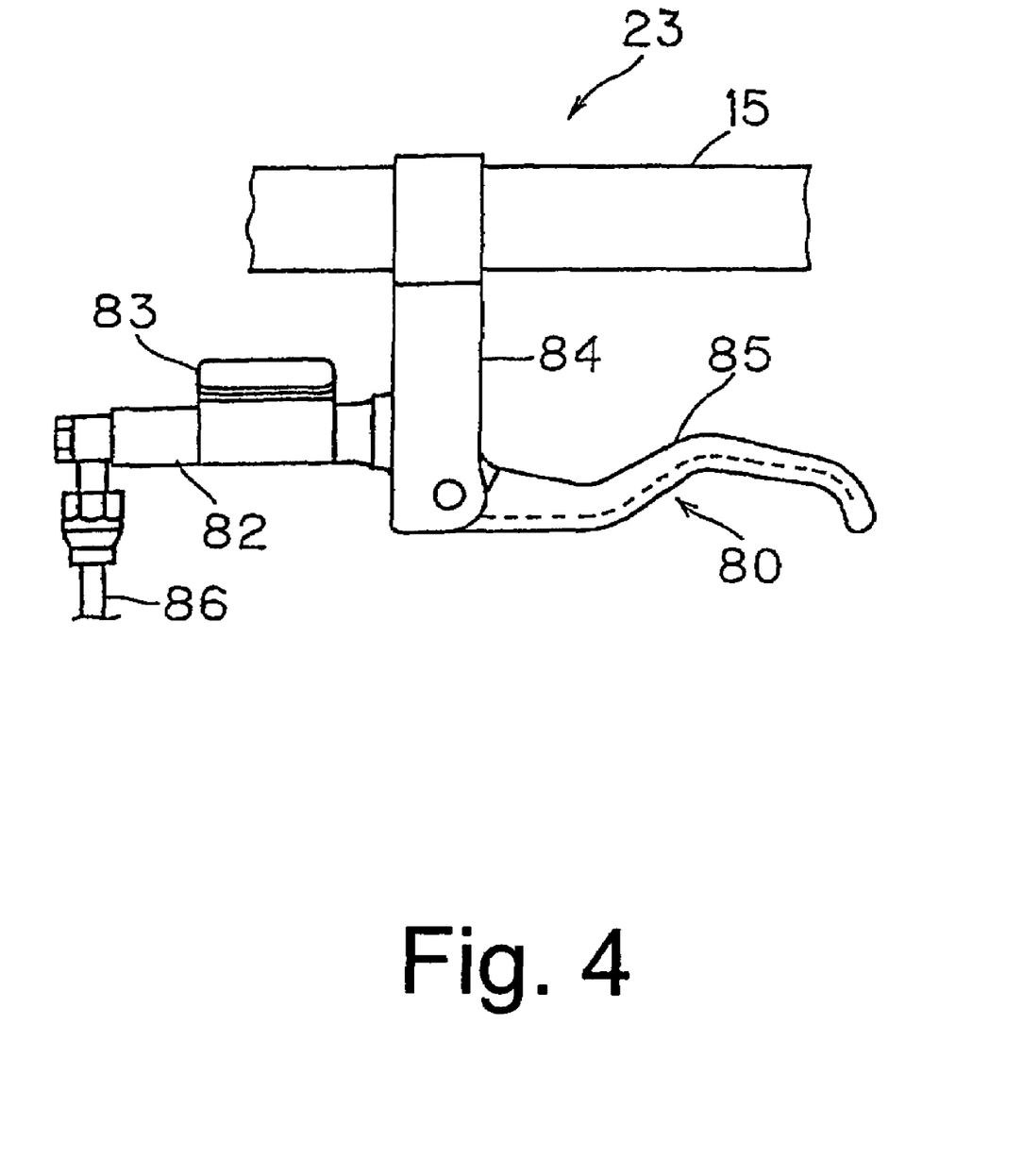
FIG. 4 is a top plan view of the disc brake operating mechanism of the disc brake device illustrated in FIGS. 1-3.

As shown in FIGS. 4 and 5, the brake operating mechanism 23 is a mechanism for applying a braking force to the front wheel 17 by operating the brake caliper 21 to forcibly clamp the disc rotor 22. The brake operating mechanism 23 is mounted as a unit on the right end of the handlebar 15. The brake operating mechanism 23 basically has a brake lever 80, a master cylinder 81, a master piston 82 and an oil tank or reservoir 83.

As shown in FIGS. 4 and 5, the brake lever 80 has a bracket 84 installed on the handlebar 15, and a lever part 85 installed on the bracket 84 so as to be freely pivot between the braking position and the brake-release position. The bracket 84 is integrally formed with the master cylinder 81, and the master piston 82 and the oil tank 83 are supported on the bracket 84. The master piston 82 is mounted so as to be movable within the master cylinder 81. More specifically, the oil tank 83 is mounted to the master cylinder 81, and supplies an operating fluid through an interior hole in the master cylinder 81. Since one end of the master piston 82 is linked to the lever part 85, the master piston 82 is movable in the axial direction within the master cylinder 81.

Accordingly, when the brake lever part 85 is operated, the master piston 82 moves in the axial direction within the master cylinder 81. In this way, pressurized oil is supplied to the hydraulic line 86 connected to the brake caliper 21 by moving the master piston 82 within the master cylinder 81. Therefore, the pressurized oil moves the piston 74 and the brake pad 76 so as to clamp the disc rotor 22 and apply a braking force to stop rotation of the front wheel 17. In the disc brake device 12, the brake caliper 21 operates between a braking position at which a braking force acts on the disc rotor 22, and a brake-release position at which the disc rotor 22 is rotatable.

Although the material of the backplate 7 is titanium or titanium alloy in the above embodiments, the material of the backplate 77 is not limited to this metal. Light metals, and high heat-resistance materials such as, for example, carbon graphite, and ceramics are desirable to lighten the weight.

Although a sintered metallic friction member that is simultaneously subjected to formation and bonding is disclosed in the above embodiments, the forming process may also be performed beforehand.

Although dichromium trioxide, tin and compounds thereof, and copper and compounds thereof are provided as examples of the friction member material in the above embodiments, the material of the friction member is not limited to these examples.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle disc brake pad comprising:
   a backplate including a spray coat surface formed with a rough surface on at least part of the spray coat surface;
   a spray coating layer containing copper directly deposited on the spray coat surface of the backplate by a spray coating, the spray coating layer being non-chemically bonded to the backplate with an engagement bond existing between a base material of the backplate and the spray coating layer; and
   a friction member bonded directly on the spray coating layer in the absence of other layers to create a diffusion bond by a diffusion bonding method.

2. The bicycle disc brake pad as set forth in claim 1, wherein the backplate is formed of titanium or titanium alloy.

3. The bicycle disc brake pad as set forth in claim 2, wherein
   the friction member is configured by calcining and bonding at least one group of powders selected from among groups including dichromium trioxide, tin and compounds thereof, and copper and compounds thereof.

4. The bicycle disc brake pad as set forth in claim 2, wherein
   the spray coating layer is formed on an area of the backplate that is larger than a contact area of the friction member.

5. The bicycle disc brake pad as set forth in claim 1, wherein
   the friction member is formed by calcining and bonding at least one group of powders selected from among groups including dichromium trioxide, tin and compounds thereof, and copper and compounds thereof.

6. The bicycle disc brake pad as set forth in claim 1, wherein
   the spray coating layer is formed on an area of the backplate that is larger than a contact area of the friction member.

7. The bicycle disc brake pad as set forth in claim 1, wherein
   the backplate is a flat planar member.

8. The bicycle disc brake pad as set forth in claim 1, wherein
   the spray coating layer has a thickness of between 50 μm and 110 μm.

9. A method of manufacturing a bicycle disc brake pad comprising:
   forming a rigid backplate including a rough surface on at least a part of a spray coat surface;
   spray coating a spray coating layer containing copper directly onto the spray coat surface of the backplate so that the spray coating layer is non-chemically bonded to the backplate with an engagement bond existing between a base material of the backplate and the spray coating layer; and
   diffusion bonding the friction member directly onto the spray coating layer in the absence of other layers to create a diffusion bond therebetween.

10. The method as set forth in claim 9, wherein
    the backplate is formed of titanium or titanium alloy.

11. A method of manufacturing a bicycle disc brake pad as set forth in claim 9, wherein the forming the rigid backplate the backplate includes forming the backplate as a flat planar member.

12. A method of manufacturing a bicycle disc brake pad as set forth in claim 9, further comprising:

forming the friction member by calcining and bonding at least one of a group of powders selected from among groups including dichromium trioxide, tin and compounds thereof, and copper and compounds thereof.

13. A bicycle disc brake pad comprising:

a backplate formed of titanium or titanium alloy including a spray coat surface formed with a rough surface on at least part of the spray coat surface;

a spray coating layer containing copper directly deposited on the spray coat surface of the backplate by a spray coating, the spray coating layer being non-chemically bonded to the backplate with an engagement bond existing between a base material of the backplate and the spray coating layer; and a friction member bonded on the spray coating layer to create a diffusion bond by a diffusion bonding method, the friction member formed by calcining and bonding at least one group of powders selected from among groups including dichromium trioxide, tin and compounds thereof, and copper and compounds thereof.

14. The bicycle disc brake pad as set forth in claim 13, wherein the spray coating layer is formed on an area of the backplate that is larger than a contact area of the friction member.

15. The bicycle disc brake pad as set forth in claim 13, wherein the spray coating layer has a thickness of between 50 μm and 110 μm.

* * * * *